United States Patent
Hundley et al.

(10) Patent No.: US 7,275,069 B2
(45) Date of Patent: Sep. 25, 2007

(54) SYSTEM AND METHOD FOR TOKENING DOCUMENTS

(75) Inventors: Douglas Hundley, Poway, CA (US); Eric Lemoine, San Diego, CA (US); Robert J. McMillen, Carlsbad, CA (US)

(73) Assignee: Tarari, Inc., San Diego, CA (US)

( * ) Notice: Subject to any disclaimer, the term of this patent is extended or adjusted under 35 U.S.C. 154(b) by 452 days.

(21) Appl. No.: 10/831,956

(22) Filed: Apr. 26, 2004

(65) Prior Publication Data

US 2005/0240911 A1    Oct. 27, 2005

(51) Int. Cl.
*G06F 17/00* (2006.01)

(52) U.S. Cl. .............. 707/104.1; 707/3; 707/6

(58) Field of Classification Search ............ 707/104.1, 707/3, 6; 717/114
See application file for complete search history.

(56) References Cited

U.S. PATENT DOCUMENTS

| | | | |
|---|---|---|---|
| 5,857,212 A * | 1/1999 | Van De Vanter | 715/519 |
| 5,946,484 A * | 8/1999 | Brandes | 717/136 |
| 5,966,702 A * | 10/1999 | Fresko et al. | 707/1 |
| 2001/0013047 A1 * | 8/2001 | Marques | 707/536 |
| 2004/0172234 A1 * | 9/2004 | Dapp et al. | 704/1 |
| 2004/0225999 A1 * | 11/2004 | Nuss | 717/114 |

* cited by examiner

*Primary Examiner*—John Cottingham
*Assistant Examiner*—Kuen S. Lu
(74) *Attorney, Agent, or Firm*—Knobbe, Martens, Olson & Bear LLP

(57) ABSTRACT

A system for tokenizing a document, such as, for example, an XML document. A classifier is configured to assign the at least one character to at least one of a plurality of character classes. Each of a plurality of token logic units is configured to concurrently perform a comparison as specified by an instruction. A comparison may comprise comparing the at least one character class to an operand. An execution unit is configured to select an action from the instruction in response to performing the comparisons and to perform the action. A method of tokenizing a document includes assigning at least one character from a document to at least one of a plurality of character classes and concurrently performing a plurality of comparisons. At least one of the plurality of comparisons comprises comparing the assigned character class to the character from the document. At least one action to be performed is selected based on at least one result produced by performing the comparisons, and the selected action is subsequently performed.

21 Claims, 6 Drawing Sheets

SYSTEM AND METHOD FOR TOKENING DOCUMENTS

BACKGROUND OF THE INVENTION

1. Field of the Invention

The invention relates to a system and method of processing structured documents. In particular, the invention relates to a system and method of lexical analysis of a structured document to produce a set of lexical tokens.

2. Description of the Related Art

The need for more robust and capable forms of data exchange on the Internet has resulted in a movement away from using easily processed binary-formatted or line-based text documents for data exchange to the use of structured documents in standardized formats such as, for example, extensible markup language (XML), hyper text markup language (HTML), or standardized general markup language (SGML). These structured documents typically are composed of human readable text containing markup symbols that define the logical structure and interrelationship of data in the document. Processing of a structured document typically begins with two steps, lexical analysis and parsing. Lexical analysis, or tokenizing, generally refers to the process of receiving a string of data bytes for a document, segmenting those bytes into one or more "lexemes," and assigning a "token" to each lexeme. A token is an identifier that labels the lexeme as belonging to the class of strings associated with that token type. A token type may represent strings that only contain alpha-numeric characters, numbers, a punctuation symbol, or any other string of data bytes that has a particular logical relevance in a document. Parsing generally refers to a subsequent stage of syntactic analysis using the tokens as input to derive a desired data structure representing the document. The tokens may include information about a document's structure. The process of tokenizing a document augments the raw information of the document by grouping character sequences into meaningful higher order, labeled objects that form the document's structure in order to simplify subsequent parsing steps. Some token values may correspond to a keyword or fixed literal string, so that only the token value needs to be reported to the parser. In other cases, the token value indicates only the class of an associated lexeme, so the parser also needs the actual characters that comprise the lexeme. For example, XML documents contain named attributes, so an XML lexical analyzer may produce a token for attributes. Each attribute token output from the tokenizer to the parser also carries with it a corresponding lexeme, which in this case is the attribute's name. The token type may signal to the parser that it needs to add an entry to an attribute table and the lexeme is the value to add. In general, the parser uses the token type to direct its activity and the lexeme, if so indicated by the token type, is the object of the activity.

Lexical analyzers have typically been used in applications such as computer software compilers where processing performance is not at a premium. A variety of methods of tokenizing exist that are well known to those of skill in the art. In particular, state machines, such as deterministic finite automata (DFA) are typically used in tokenizers that run as software on a general purpose computer processor. However, in high-volume applications, such as in email or other server applications, software implementations may not be adequate. Performing lexical analysis is a computationally expensive step, because each byte or symbol of the information being analyzed must be processed. While every symbol may not be assigned to a token, every symbol is typically examined to make that determination. The number of tokens of output is typically significantly less than the number of symbols of input. For example, if the average number of symbols per token in a particular application is 10, then the token output rate is $\frac{1}{10}^{th}$ the symbol input rate. In some applications, ignoring some symbols may not affect later parsing. Thus, ignoring these symbols leads to a further reduction in the number of tokens that are output. Generally, in languages, such as HTML and XML, virtually every symbol maps to a token.

When a DFA is used to perform the tokenizing process, a state machine engine is used to execute a representation of a state machine designed to recognize the lexemes that comprise the language to be parsed. A state machine has an initial state, intermediate states, and one or more terminal states. Execution always begins with the initial state. The initial state has only out-transitions to other states, or possibly one or more transitions back to itself. Intermediate states have at least one in-transition and at least one out-transition. Terminal states have only in-transitions. Associated with each transition, is a character from the symbol set the machine recognizes. As each character of input is processed, it is matched to a transition out of the current state, causing the state machine to change states. The process is repeated until a terminal state is reached. The terminal state indicates which lexeme has been identified or that there was no match, which may indicate an error.

In an implementation of a lexical analyzer using the DFA approach, a state machine is generally translated into a state transition table representation that is executed by a state machine engine. In any given state machine, each non-terminal state may have an out-transition for each possible character or symbol. Therefore, the state transition table representation must be sized accordingly. Hence, the amount of memory required by a state transition table is proportional to the product of the number of states and the total number of possible characters the machine recognizes. ASCII (American Standard Code for Information Interchange), can be represented using 7 bits, so the worst case size of the symbol set is 128. Other character sets, such as EBCDIC (Extended Binary Coded Decimal Interchange Code) and the fifteen ISO 8859, 8 bit character sets used for European languages, ISO-8859-L1 for example, are represented using 8 bits, so there can be at most 256 symbols. The Unicode standard has support for hundreds of languages with code points for thousands of characters. The UTF-16 representation uses two bytes for most characters with provisions to use four bytes for extended character sets. Just the two byte characters require support for up to 65,536 symbols. Typical state machines have hundreds of states, so the memory requirements for supporting two byte characters can rapidly become prohibitive, especially for hardware implementations. Thus tokenizers typically only support one byte representation of input symbols. When Unicode is supported, UTF-8, which represents most of the non-ASCII characters using multibyte sequences of from two to six bytes, is typically employed, and the data is processed one byte at a time. Because both HTML and XML support Unicode, support for high performance processing of Unicode symbols is desirable for many applications. However, a drawback to processing one byte at a time is lower performance compared with an implementation that can process two bytes at a time. Thus, a need exists for tokenizers that support a multi-byte representation of symbols without the impractically large state machines that would be required with a DFA.

One potential solution to improving the throughput of document processing on a general purpose computer processor system is to offload portions of the processing to special purpose content processors. Content processors typically comprise dedicated electronic hardware adapted to performing portions of document processing in a server. Thus, one way of increasing throughput of a lexical analysis is to perform this task using specialized content processor hardware. However, the large size of the state machines generated for a typical high level language such as, for example, XML, has limited the application of hardware solutions such as, for example, field programmable gate arrays (FPGA) that might be employed in a content processor. Thus, a need exists for improved systems and methods of tokenizing documents.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Embodiments of the Invention" one will understand how the features of this invention provide advantages that include increased throughput of file processing of, for example, XML files on a content processor.

One embodiment of the invention is a system for tokenizing a document, such as, for example, an XML document. A memory is configured to store a plurality of instructions. Each of the plurality of instructions comprises a plurality of comparisons and a plurality of actions. Each comparison comprises an operand. An instruction pointer is configured to identify one of a plurality of instructions. A classifier is configured to assign a character from the document to at least one of a plurality of character classes. Each of a plurality of token logic units is configured to concurrently perform at least one of the plurality of comparisons of the identified instruction. Each of a plurality of token logic units is configured to concurrently compare the operand of at least one of the plurality of comparisons to at least one character class. An execution unit is configured to select at least one of the plurality of actions of the identified instruction responsive to a result of the plurality of comparisons and to perform the at least one action.

Another embodiment is a method of tokenizing a document. The method includes steps of assigning at least one character from a document with at least one of a plurality of character classes and concurrently executing a plurality of comparisons. Each of the comparisons comprises an operand and is associated with an action. Executing at least one of the plurality of comparisons comprises comparing the at least one of the plurality of character classes with the operand. At least one action to be performed is selected based on a result of performing the plurality of comparisons, and the action is executed. In one embodiment, an integrated circuit is programmed with software for performing the steps of this method.

DETAILED DESCRIPTION OF EMBODIMENTS OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

The use of dedicated digital hardware logic, such as in a field programmable gate array (FPGA) or an application specific integrated circuit (ASIC) typically allows for increased performance and throughput for the target application. Moreover, modules may be replicated to allow parallel processing to further increase throughput. However, the use of hardware solutions for tokenizing has been limited by the difficulty of translating the large state machines that ordinarily typify computer document languages such as XML into cost-effective hardware structures, such as, for example, FPGAs.

While tokenizers typically classify characters during processing of a document, these classifications are generally based merely upon the lexical features of the structure, or language, of the document. Thus, for example, an XML tokenizer may assign a character to a class such as that comprising alphanumeric characters. However, it is been discovered that by performing an additional pre or meta classification of each character in a document, the size of the state machine is reduced sufficiently to enable an efficient, compact hardware tokenizer that may be constructed to also perform certain elements of the processing activity in parallel. A benefit of this approach is that only the size of the table used to perform the classification is proportional to the size of the character set supported. The size of the instruction memory is proportional only to the number of states in a corresponding state machine, and not to the product of the states times the character set size, as with a DFA. Hence this approach makes it practical to support two byte character sets such as UTF-16.

Figure 1:
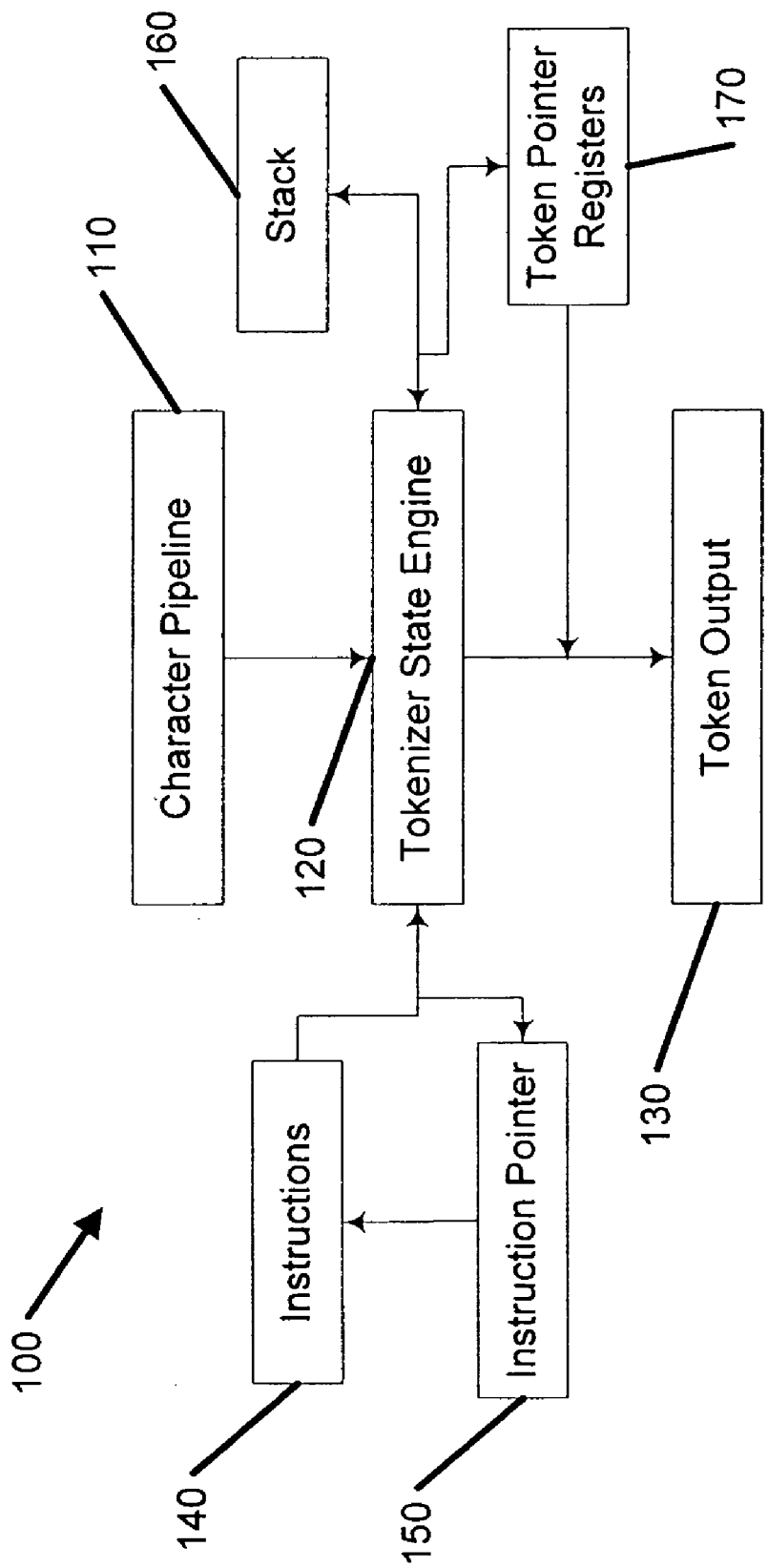
FIG. 1 is a system block diagram of one embodiment of a document tokenizing system.

FIG. 1 is a block diagram of one embodiment of a system 100 for tokenizing a document. A character pipeline 110 receives characters from a document, such as, in one embodiment, an XML document, and sends them at the rate of at least one per time unit to a tokenizer state engine 120. The tokenizer state engine 120 processes the stream of characters from the pipeline 110 and produces tokens through a token output memory 130.

The tokenizer state engine 120 processes the characters in response to instructions in an instruction memory 140. At each instruction cycle, the instruction located at a memory location in the instruction memory 140 indicated by an instruction pointer 150 is loaded into the state engine 120. Each instruction causes one or more comparisons to be performed in the state engine 120. An output action is executed by the state engine 120 as a result of the comparisons. The output action includes updating the instruction pointer 150 and performing one or more actions, such as outputting a token from the token pointer registers 170 to the memory 130. Another output action is modifying a stack 160. The stack 160 provides a last-in-first-out storage space for use by the state engine 120. The output action may also modify one or more token pointer registers 170 in order to keep track of the beginning and ending of a token in the document. The comparisons in the state engine 120 may be based on a character, a classification of the character, or state related variables, including the size and contents of the stack 160.

A limitation of DFA based implementations is their inherent inability to verify symbol pairing constraints. A simple example of this is verifying that for every opening parenthesis, "(", in a string there is a corresponding closing parenthesis, ")", given that the parenthesis can be nested to arbitrary depth. Such a check is usually relegated to the parsing phase. A DFA tokenizer is limited to recognizing an opening element and a closing element separately. However, performing this check during the tokenizing phase can speed later processing. By including the stack 160, the system 100 does not have this limitation. Thus, in addition to checking for proper nesting, a single token may include nested, symbol pairing, such as was described earlier for matching parentheses.

Figure 2:
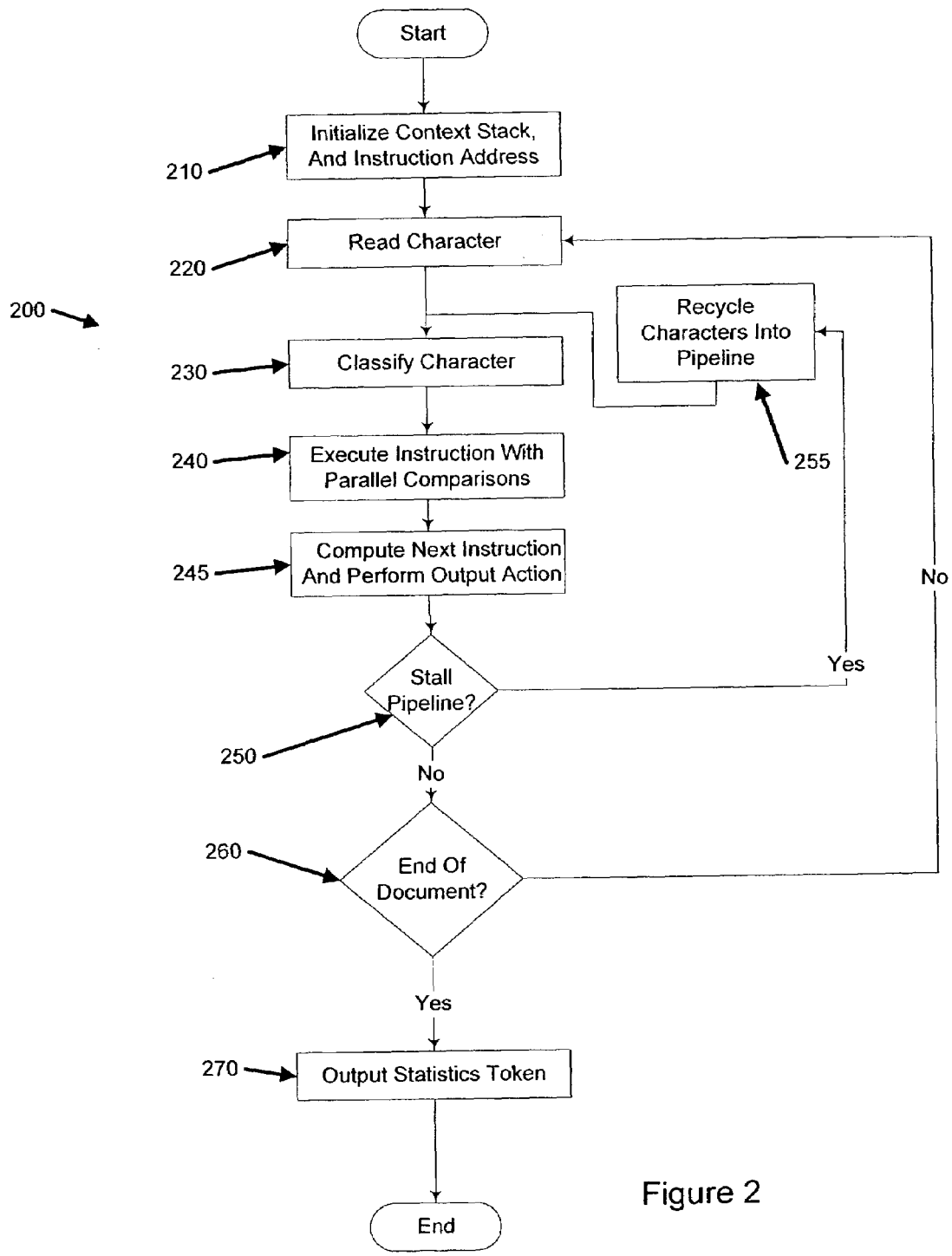
FIG. 2 is a flow chart depicting one method of tokenizing a document using hardware logic in a system similar to that depicted in FIG. 1.

FIG. 2 is a flow chart depicting one embodiment of a method 200 of tokenizing documents, such as the embodiment of the system 100, depicted in FIG. 1. It is to be appreciated that depending on the embodiment, additional steps may be added, others removed, steps merged, or the order of the steps rearranged. When processing of a document begins, the method 200 proceeds from a start state to a step 210 in which the stack 160, the registers 150 and 170, and any other system components may be initialized. Next at a step 220, a character is read from the document and fed into the pipeline 110. Moving to a step 230, the character is identified with one of a set of character classes. Table 1 lists a set of classes used in one embodiment of the method 200 in which XML files are tokenized. In the embodiment using the classes defined in Table 1, two additional "classes," having identifiers 18 and 19, are assigned based on the state of the stack 160, e.g., whether the state stack has one or less entries. As discussed below, these additional classes may be used to optimize and simplify character processing in the state engine 120 by processing these "classes" using the same logic as is used for processing other character classes.

TABLE 1

Exemplary XML Character Classifications

| ID | Meta Classification | Definition |
|---|---|---|
| 0 | Is_NCNameChar( ) | Is_Letter | Is_Digit | Is_CombiningChar | Is_Extender | [.\-_] |
| 1 | Is_NameChar( ) | Is_Letter | Is_Digit | Is_CombiningChar | Is_Extender | [.\-_:] |
| 2 | Is_PubidChar( ) | [\x20]|[\xD]|[\xA]|[a-zA-Z0-9]|[\-'( )+, ./:=?;!*#@$_%] |
| 3 | Is_Ampersand( ) | [&] |
| 4 | Is_Alpha( ) | [a-zA-Z] |
| 5 | Is_Num( ) | [0-9] |
| 6 | Is_HexNum( ) | [0-9a-fA-F] |
| 7 | Is_WhiteSpace( ) | [\x20\x9\xD\xA] |
| 8 | Is_VersionNum( ) | ([A-Za-z_0-9._:]|"-") |
| 9 | Is_Char( ) | (See XML Spec) excluding [&<>] |
| 10 | Is_LessThan( ) | [<] |
| 11 | Is_EncNameChar( ) | [A-Za-z_0-9._]|"-" |
| 12 | Is_NcNameStart( ) | ['_'] | Is_Letter |
| 13 | Is_CloseParen( ) | [)] |
| 14 | Is_GreaterThan( ) | [>] |
| 15 | | |
| 16 | | |
| 17 | | |
| 18 | Is_StateStackEmpty( ) | State Stack has 1 or less entries |
| 19 | Is_StateStackNotEmpty( ) | State Stack has 2 or more entries |

Proceeding to a step 240, the state engine 120 executes an instruction in the instruction memory 130 that is indicated by the instruction pointer 150. In one embodiment, the instruction to be executed specifies a set of comparisons between an operand specified by the instruction for each comparison and the character, the assigned class of the character, or other information associated with the state engine. In the instruction, each comparison is associated with a new instruction pointer value and an output action to perform. In a preferred embodiment, each instruction includes three comparison operations and associated instruction and action data. Also in a preferred embodiment, each of the three comparison operations is performed concurrently. Table 2, below, describes the field layout of an instruction for one embodiment of method 200 in which three comparisons are performed concurrently. After executing the instruction, the state engine 120 selects a new instruction pointer value and output action based on the result of the comparisons. The instruction pointer 150 is updated to the new instruction pointer value and the state engine 120 performs the selected output action.

In one embodiment, each comparison in the instruction may include an operator and an operand. A comparison may be satisfied if the result of performing the operator with respect to the operand is non-zero. Preferably, each operand field has a bit size that is at least as large as the bit size of the output of the character classifier. More preferably, in an embodiment in which the classes are as depicted in Table 1, the operand field is 20 bits wide. The operators may include operations on the character itself, which may include an exact match, or equality function, or a caseless match, such that the character "A" matches the character 'a'. The operators may also perform operations on the class with the operand that may include an AND operation or an OR operation.

The operators may also operate on the context of the system 100 which, in one embodiment, is the context at the top of the stack 160. The operations on the context may include a match with the operand, or an OR operation with the operand. In addition, operators may be defined that are always satisfied or that are never satisfied. Moreover, an operator may be a combination of the above operations, including, for example, a match with a character ANDed with a match with the context, a caseless match with a character and a context match, a match with a character ANDed with an OR operation on the context, or a caseless character match ANDed with an OR operation on the context.

Moving on to a step 245, based on the results of the comparisons, an output action associated with one or more of the comparisons by the instruction is performed by the state engine 120. Preferably, only the output action associated with one comparison function listed in the instruction is performed. More preferably, each instruction defines an implicit priority on its output actions. The output actions may include saving a pointer register with the position of the start of a token, saving a pointer register with the position of the end of a token, sending a token, setting the user defined context of the execution unit, pushing the user defined context onto the stack, popping the user defined context from the stack, or stalling the pipeline. In addition, the instruction pointer 150 is updated at this time, preferably also to the value associated with the highest priority output action.

Next at a step 250, the pipeline 110 may be stalled if that step is specified by the output action. When the pipeline is stalled, the method 200 moves to a step 255 in which the last character value in the pipeline 110 is recycled. After the characters are recycled into the pipeline 110, the method 200 returns to the step 230. It has been discovered that the character classifications may be selected so as to minimize the number of stall states that are reached, and thereby increase the throughput of the method 200 by minimizing the delays related to stall states. In an embodiment of the method 200 in which the documents are XML documents, the character classifications are preferably selected as depicted in Table 1 in order to minimize the number of stalls. Reducing the number of stalls increases the throughput of the method 200.

Alternatively, the method 200 moves to a step 260 where, if the end of the document has been reached processing proceeds to a step 270. If the end of the document is not reached, processing returns to the step 220 and functions as described above. In the step 270 of the method 100, a set of statistics regarding the characters and tokens in the document may be output and the method 100 terminates. For example, in an XML document tokenizer, the statistic token output at the step 270 may include a count of the number of times that an attribute, or token, is encountered in the document. The maximum depth of elements in a structured document, e.g., an XML document, may also be tracked. In one embodiment of the method 200, a count is incremented or decremented each time a token that specifies an increase or decrease in element depth of the document is encountered. By tracking the maximum value of this count, the maximum element depth of the document may be maintained, and this value may be output as a token at the step 270. It is to be appreciated that in some embodiments, different statistics may be maintained. In other embodiments, no statistics are maintained.

Figure 3:
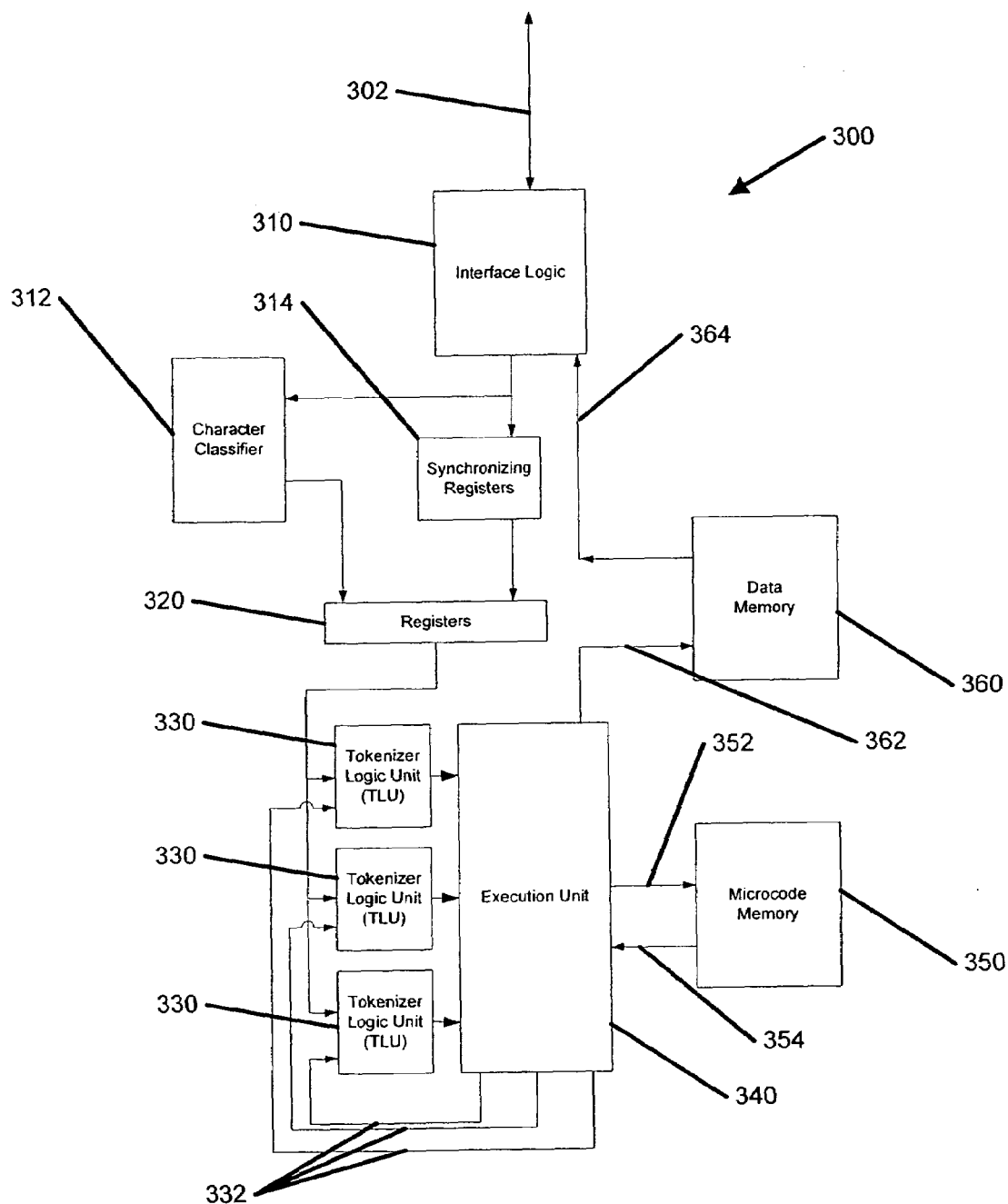
FIG. 3 is a system diagram depicting one embodiment of a document tokenizing system for performing the method depicted in FIG. 2.

FIG. 3 depicts one detailed embodiment of a system 300 of tokenizing a document similar to the system 100, and that may perform one embodiment of the method 200. Preferably, the system 300 is implemented using hardware logic. More preferably, the system 300 is implemented using an FPGA. However, it is to be appreciated that the system 300 is not limited to any particular logic implementation, and thus may be embodied in any logic circuit that is capable of performing the functions described herein.

In the embodiment depicted in FIG. 3, the system 300 interfaces with associated computer software and hardware through an interface bus 302. The interface bus is electrically coupled to interface logic 310. The interface logic 310 may be configured to receive characters read from a document to be tokenized. The interface logic 310 may provide a queue, such as a first in first out (FIFO), for receiving characters. The interface logic may also include logic that swaps byte order in 16 bit characters, and may include logic that converts between different character sets (e.g. between ISO-8859-L1 and UTF-16). In addition, the interface logic 310 may include additional FIFOs for outputting data from the system 300.

As each character of a document to be tokenized is received, the interface logic 310 sends the data to a character classifier 312. In one embodiment, the character classifier 312 includes a lookup table. A lookup table embodiment of the classifier 312 may include internal or external random access memory. This memory may include SSRAM, SDRAM, or any other suitable technology. In one exemplary embodiment, an external SSRAM is included.

In one embodiment, the classifier 312 may also output a signal based on other state information associated with the system 300. For example, the classifier 312 may output additional data indicating whether or not a stack in an execution unit 340, discussed below, is empty or not.

In parallel to sending the character to the classifier 312, the interface logic may also send the character to synchronizing registers 314. The synchronizing registers 314 hold each character while the character is concurrently processed by the classifier 312. For example, in one embodiment, the classifier 312 may require 6 cycles to process and pass on each character. To synchronize the classifier 312 output with the corresponding character, the registers 314 hold each character for six cycles. Thus, in this embodiment, the synchronizing registers 314 comprise a six clock pipeline.

The classification from the classifier 312 and the corresponding character from the synchronization registers 314 are received by registers 320. The classification and character are then evaluated, preferably in parallel, in a set of tokenizer logic units (TLU) 330. It is to be appreciated that while three TLUs are included in the embodiment of the system 300 depicted in FIG. 3, an embodiment of the system 300 may include more or less TLUs 330 as may be appropriate to a target document language, or available hardware resources. Further, in one embodiment, each TLU 330 may include the registers 320.

Each TLU 330 executes a comparison that may be specified by an instruction that is received from the execution unit 340 via interface or bus 332. Table 2, below describes the instruction layout of one embodiment having three TLUs 330. The comparison specified in the instruction may include a comparison operator and an operand. In one embodiment, each comparison operator may specify a comparison between the operand and the classification of the character, the character, a representation of whether the stack is empty, or the current context of the execution unit 340. Each comparison may have one or more output actions and an instruction pointer associated with it. The execution unit 340 may then select actions to perform and a new instruction pointer based on the result of the comparisons.

The output actions to be performed may be selected by assigning a priority to each comparison. The output actions associated by the instruction to the comparison which evaluates to true (e.g., having a non-zero result) and which has the highest priority may be the selected. In one embodiment, the execution unit 340 is configured such that the comparison made by each TLU 330 has an implied priority based on the order of the comparison in the instruction. Thus, the selected output actions and instruction pointer are based on the first comparison to evaluate to true in the instruction. If no comparison evaluates to true, default output actions and a default instruction pointer may be specified in each instruction.

TABLE 2

Exemplary Instruction Layout

| Field | Size (bits) | Description |
| --- | --- | --- |
| Comparison Function 1 | 10 | Concurrent comparison operator for 1st TLU 230. See Table 1 for values. |
| Operand 1 | 19 | Operand for comparison in 1st TLU 230. |
| Next Instruction Pointer 1 | 10 | Instruction pointer to load if Comparison Function 1 evaluates to non-zero. |
| Output Function 1 | 9 | Output function to perform if Comparison Function 1 evaluates to non-zero |
| Comparison Function 2 | 10 | Concurrent comparison operator for 2nd TLU 230. |
| Operand 2 | 19 | Operand for comparison in 2nd TLU 230. |
| Next Instruction Pointer 2 | 10 | Instruction pointer to load if Comparison Function 2 evaluates to non-zero. |
| Output Function 2 | 9 | Output function to perform if Comparison Function 2 evaluates to non-zero |
| Comparison Function 3 | 10 | Concurrent comparison operator for 3rd TLU 230. |
| Operand 3 | 19 | Operand for comparison in 3rd TLU 230. |
| Next Instruction Pointer 3 | 10 | Instruction pointer to load if Comparison Function 3 evaluates to non-zero. |
| Output Function 3 | 9 | Output function to perform if Comparison Function 3 evaluates to non-zero |
| Default Next Instruction Pointer | 10 | Instruction pointer to load if all other comparison functions evaluate to zero. |
| Default Output Function | 9 | Output function to perform if all other comparison functions evaluate to zero. |

The selected output actions are performed and the new instruction pointer is used to select the next instruction to be executed by the TLUs 330 and the execution unit 340. The instruction pointer may be used to access a microcode memory 350 via an address bus 352 to retrieve this next instruction via an instruction bus 354.

Execution of an output action may modify the state of the execution unit 350. The output actions may include saving a pointer register with the position of the start of a token, saving a pointer register with the position of the end of a token, sending a token, setting the user defined context of the execution unit, pushing the user defined context onto the stack, popping the user defined context from the stack, or stalling the pipeline. Table 3 describes the output action layout in the instruction field of one embodiment of the system 300.

TABLE 3

Exemplary Output Action Layout

| Field | Size (bits) | Description |
| --- | --- | --- |
| Save Start Pointer | 1 | Output action includes saving a token start pointer. |
| Save End Pointer | 1 | Output action includes saving a token end pointer. |
| Send Token | 1 | Output action includes sending a token to token memory. |
| User Defined Context | 6 | A value for the user defined context is set using this value. |

TABLE 3-continued

Exemplary Output Action Layout

| Field | Size (bits) | Description |
|---|---|---|
| Push State | 1 | The User Defined Context field value is pushed onto the stack 160. |
| Pop State | 1 | A context is popped from the stack 160. In one embodiment, if both push and pop are specified, the top entry of the stack is replaced. |
| Stall Pipeline | 1 | Output action includes stalling the character pipeline 110. |

In one embodiment, the output actions may include stalling the pipeline when, for example, processing of a character cannot be completed by an instruction in a specified period such as a single cycle. Stalling the pipeline effectively extends the number of TLUs available to evaluate the instruction. If the number of potential comparisons required to process a character exceeds the number of TLUs, then the output action may be to stall the pipeline and continue to evaluate the character in another instruction (comprising another set of TLU evaluations). In order to optimize the system, the most likely outcomes may be placed in the first instruction to avoid stalls. When the pipeline is stalled, the values in the character register 320 are recycled through the TLUs 330. In one embodiment, shadow registers are used to hold one or more characters in the pipeline and to replay the held characters to the TLUs 330.

When the selected output action performed by the execution unit 340 is sending a token, the execution unit 340 sends the token data along memory bus 362 to a data memory 360. The data memory 360 may include a token lookup table in which each token is referenced by an ID number. The token lookup table allows tokens to be arbitrarily assigned a numeric value that is independent of the state of the system 100. Preferably, the lookup table is programmable. However, other embodiments may provide a lookup table that is based on extending the output action field to include additional bits to identify tokens or that is based on some other unique value, such as the current state plus, e.g., the index of the associated comparison in the instruction. The interface and control logic 310 may then send the tokens out of the system 300.

In one embodiment, the tokens may also include information relating to parsing errors. Thus, for example, the tokens may indicate the line and column in the file where the token was found to enable the tokenizer 300 or a system using the tokens to narrow down the location of an error in the document.

Figure 4:
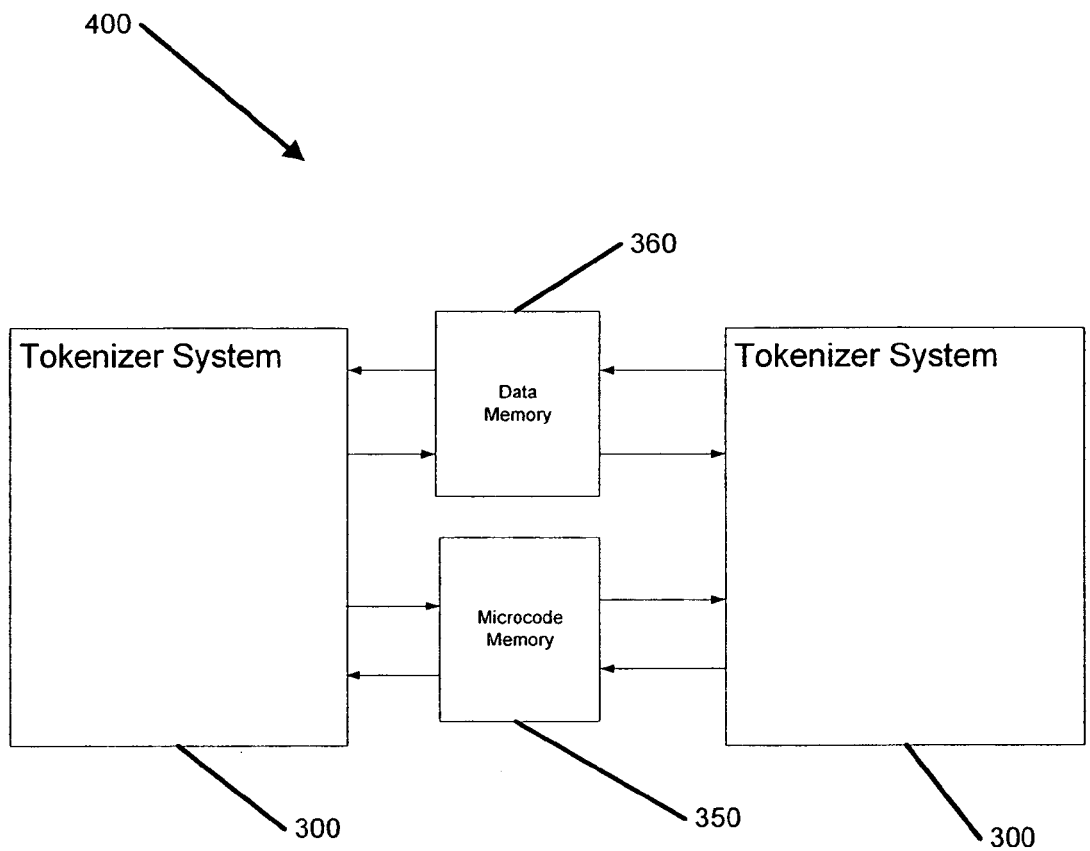
FIG. 4 is a system diagram depicting one embodiment of a document tokenizing system that includes two tokenizing systems similar to the system depicted in FIG. 3.

In one embodiment, depicted in FIG. 4, the system 300 may include a dual tokenizer system 400. The dual system 400 includes two embodiments of the tokenizer systems 300. In the depicted embodiment, each of the tokenizer systems 300 shares the instruction memory 150 and the data memory 160. Preferably, each of the instruction memory 150 and the data memory 160 are dual ported memories. This arrangement allows, for example, two documents to be processed concurrently.

Figure 5:
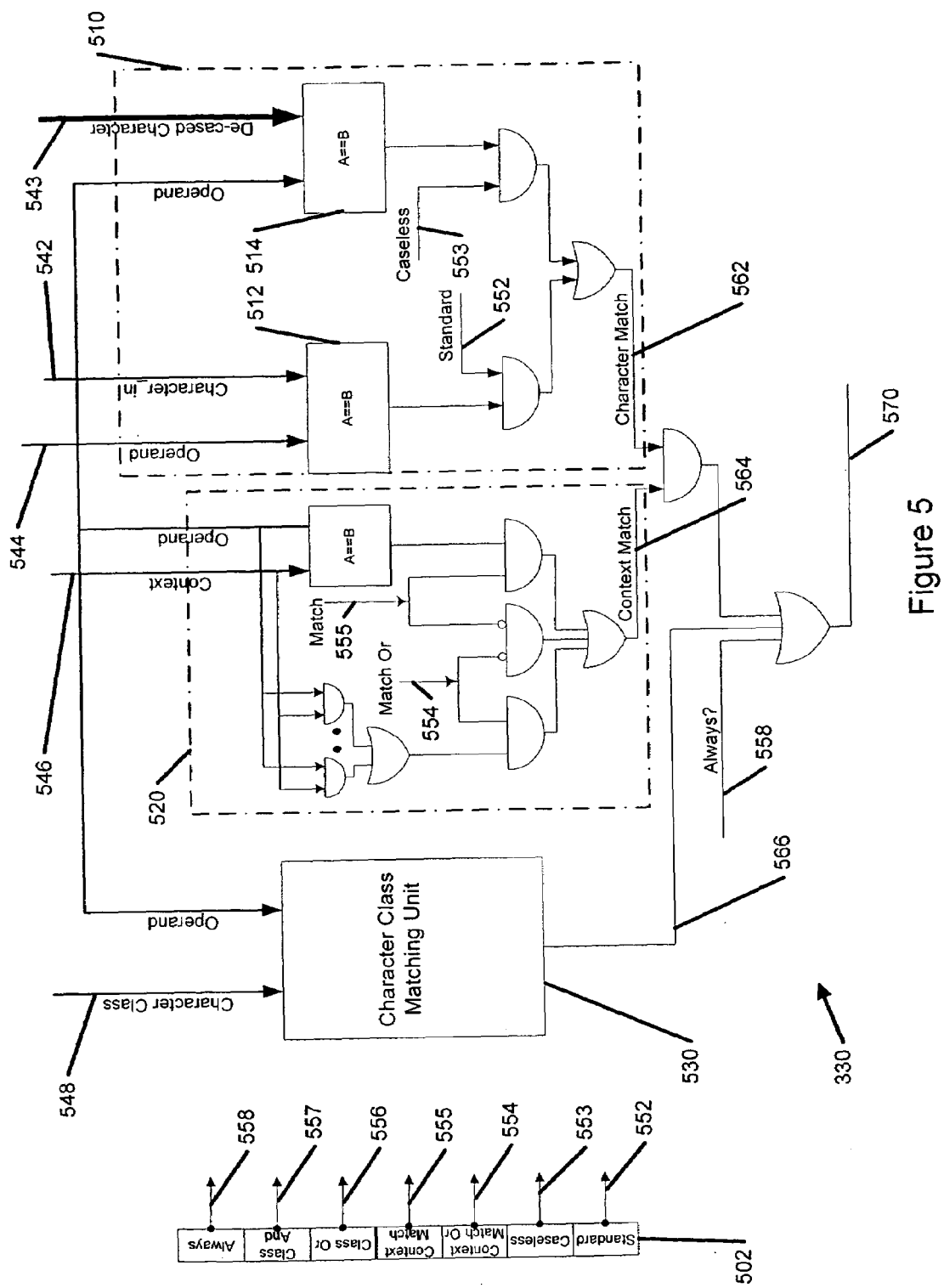
FIG. 5 is a logic diagram depicting one embodiment of a tokenizing logic unit, such as may be included in a system similar to that depicted in FIG. 3.

FIG. 5 is a logic diagram of one embodiment of the TLU 330. The TLU 330 operates in response to an instruction register 502 which generates signals 552-558 for each control bit of the current instruction that is configured to control the TLU 330. The TLU 330 may include a character matching unit 510, a context matching unit 520, and a character class matching unit 530. In one embodiment, the character matching unit 510 includes separate logic circuits 512 and 514 for both a case sensitive and a caseless comparison, respectively. Thus, the character matching unit receives input signals for both the character 542 and the de-cased character 543. In one embodiment, the de-cased character input 543 includes the character code minus 32, corresponding to the coding of upper and lower case in, for example, ASCII and ISO-8859-L1 code sets. The character matching unit then compares each of the character input 542 and de-cased character input 543 with the instruction operand 544. In one embodiment, each possible comparison operator is executed in parallel and the results of the caseless, and case-sensitive comparisons are logically combined, e.g., using a logical AND, with decoded instruction control inputs, including the standard or case-sensitive match input 552 and caseless match input 553. The results of this logical combination is further combined using, e.g., a logical OR to produce an intermediate output 562 that is further combined with the results of other logic units, as described below.

The context matching unit 520 receives the operand 544 and the current context value 516. In one embodiment, the current context value is the value on the top of stack 160. In one embodiment, comparisons with operands using both OR and AND logical operators are performed in parallel and the results logically combined, e.g., using a logical AND, with decoded instruction inputs, 554 and 555, respectively, to produce an intermediate output 564 that is further combined with the results of other logic units, as described below.

Figure 6:
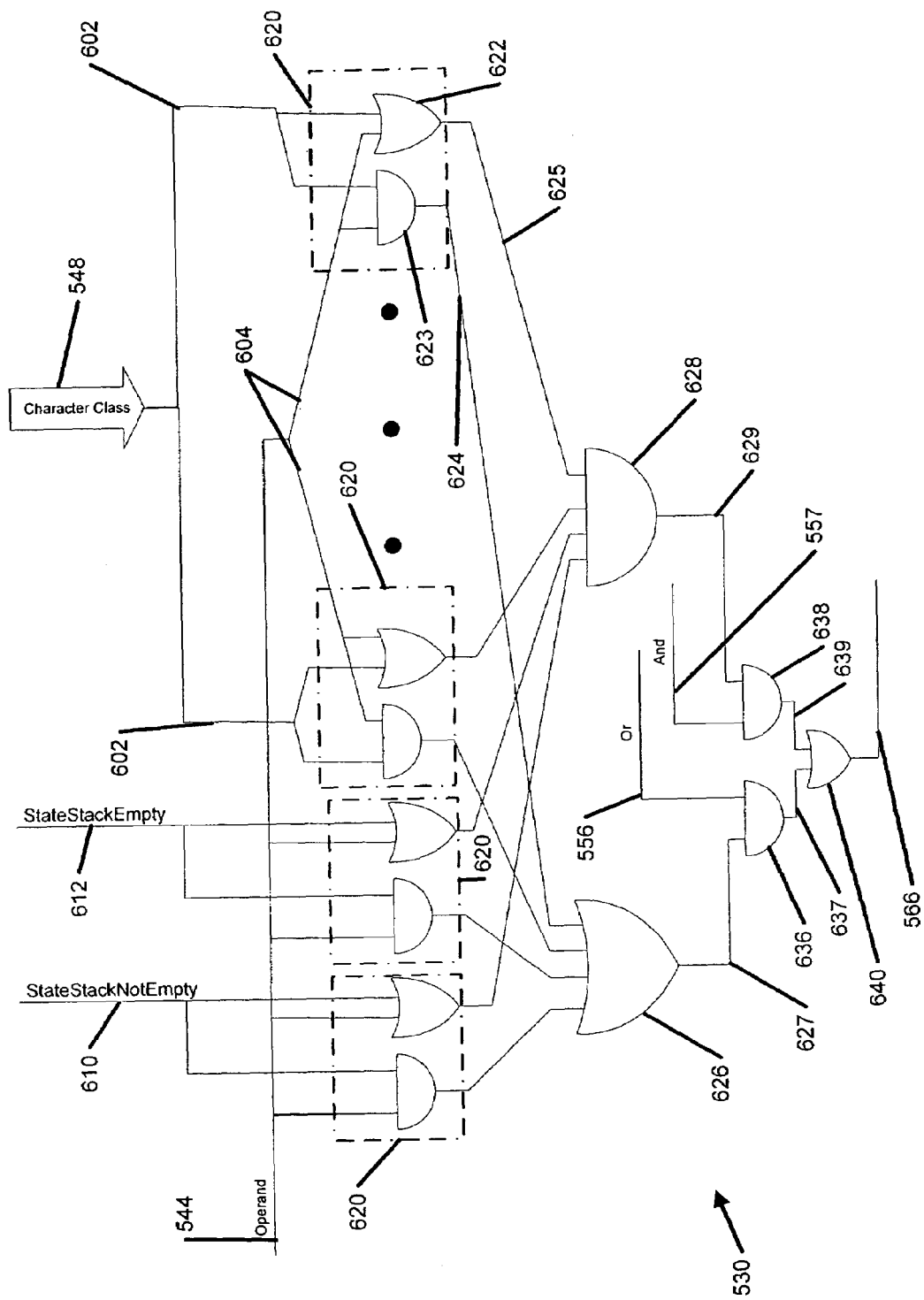
FIG. 6 is a logic diagram depicting a portion of the tokenizing logic unit depicted in FIG. 5.

The character class matching unit 530 is depicted in greater detail in FIG. 6. Inputs to the class matching unit 530 include the operand 544 and the character class 548. Preferably, the character class 548 comprises a set of inputs 602, one for each character class. The operand 544 may comprise a bit-wise set of inputs 604. In addition, the inputs may include signals related to the state of the context stack 160, shown in FIG. 1, such as the stack not empty 610 and stack empty 612 signals. In one embodiment, as discussed above with respect to Table 1, these signals 610 and 612 may also be represented by character class inputs 602 from the character class input 548. In one embodiment, each of the character class inputs 602 is compared to a respective operand input 604 using a class comparison logic block 620. While FIG. 6 depicts only two such blocks 620 coupled to the character class input 548, it is to be appreciated that additional units, one for each of the, in one embodiment, eighteen, character classes of Table 1 may be employed to compute the result of the character class comparison in parallel.

In one embodiment each class comparison logic block 620 comprises both an OR operator 622 and an AND operator 623. Each input 602 and 604 is fed into each of the OR 622 and the AND 623 of each block 620 to produce outputs 624 and 625, respectively. Note that to improve readability, each of item 622, 623, 624, and 625 is labeled only on the instance of the rightmost block 620 on FIG. 6, but it is to be appreciated that each of the blocks 620 is also so composed.

Each of the outputs 624 of the blocks 620 may be logically combined using an OR operation 626 to produce an output 627. Each of the outputs 625 of the blocks 620 may be logically combined using an AND operation 628 to produce an output 629. The outputs 627 and 629 may be respectively combined using AND operators 636 and 638 with the control signals 556 and 557 from the current instruction 502 to produce the outputs 637 and 639, respectively. Finally, the outputs 637 and 639 are logically combined using an OR operator 640 to produce the output 566 of the class matching unit 530. In short, through the logic circuit of unit 530, the instruction signals 556 and 557 select which of the results of the parallel operation of an AND function between the operand 544 and the inputs 548, 610, and 612, and an OR function between the operand 544 and the inputs 548, 610, and 612 is the output 566 of the character class matching unit 530. Preferably, 566 and 557 do not signal logically true simultaneously.

Returning to FIG. 5, each of the intermediate outputs 562, 564, and 566 is logically combined, e.g., using a logical OR, to produce the final result 570 of the TLU 330 comparison which represents the result of one comparison specified by the current instruction. Preferably, 566 and 557 are not logically true simultaneously. In one embodiment, the logic result 570 may also be logically combined using an OR operation to a control input 558 from the current decoded instruction that indicates that the logic result 570 should always be true or "1." This result is then used, along with the equivalent results from other TLUs 300 by the execution unit 120 to select an output action for the current instruction to be performed, as described above with respect to FIG. 3.

In one embodiment, at least part of the system 300 is created as part of a process of programming an FPGA. In one embodiment, the system 300 is specified using a hardware description language, such as, for example, VHDL. However, it is to be appreciated that the system 300 may also be embodied in other forms, such as, for example, an application specific integrated circuit (ASIC), or any other circuit capable of performing logic comparisons.

One embodiment of the tokenizing system 300 may also include support for file fragmentation. When file fragmentation is used, a portion of a first document may be received by the tokenizer system 300, and then a portion of a second document may be received by the tokenizer 300, followed then by more of the first file being received. In one embodiment, this may be accomplished by saving the state of the system 300 (including the context stack 160) after receiving the end of the fragment. In one embodiment, the system 300 registers may be saved to memory. When more of the fragmented document's data is received, the state of the system 300 is reloaded from the registers, and processing continues where left off for the fragmented document. Supporting file fragmentation provides many benefits, for example, it enables the tokenizing system 300 to temporarily defer processing of a portion of a very large file to process a smaller file without delay.

In one embodiment of a system 300 that supports file fragmentation and in which the system 300 is configured to receive multibyte characters in, e.g., UTF-8 format, the stream of characters in the fragmented document may be interrupted, or fragmented, while in the middle of a multibyte UTF-8 character. In one embodiment, the "partial" characters that have already been received may be saved in memory, and then, when new data from the fragmented file is received, the received portion of the partial characters may be resent through the system 300 before starting the new data from the next fragment.

In view of the above, one will appreciate that embodiments of the invention overcome many of the longstanding problems in the art by providing a document tokenizer that may be effectively accelerated using digital hardware to decrease processing time, and increase throughput in, for example, a content processing system.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of tokenizing a document the method comprising:
   receiving at least a portion of a document, the portion comprising at least one character;
   assigning the at least one character to at least one of a plurality of character classes; and
   concurrently performing a plurality of comparisons defined by at least one instruction wherein performing at least one of the plurality of comparisons comprises comparing the assigned character classes to an operand of the instruction;
   selecting at least one of a plurality of executable actions based on at least one result of performing the plurality of comparisons;
   executing the at least one of a plurality of executable actions; and
   storing tokenizing state information to a memory based on executing the action.

2. The method of claim 1, wherein performing at least one of the plurality of comparisons comprises comparing the at least one character to said operand associated with said instruction.

3. The method of claim 1, wherein performing at least one of the plurality of comparisons comprises comparing saved tokenizing state information to said operand associated with said instruction.

4. The method of claim 1, wherein storing the tokenizing state information comprises outputting a token to the memory.

5. The method of claim 1, wherein at least one of the steps of assigning and performing is performed using an FPGA (Field Programming Gate Arrays).

6. A system for tokenizing a document the system comprising:
   a memory configured to store at least a portion of the document, the portion comprising at least one character,
     wherein the memory is further configured to store a plurality of instructions wherein each of the plurality of instructions defines a plurality of comparisons and a plurality of actions and wherein each comparison comprises an operand and wherein the memory is further configured to store tokenizing state information;

an instruction pointer configured to identify one of the plurality of instructions; a classifier configured to assign the at least one character to one of a plurality of character classes;

a plurality of token logic units configured to operate, at least in part, concurrently,
- wherein each of the plurality of token logic units is configured to perform one of the plurality of comparisons of the identified instruction so as to produce an output and
- wherein at least one of the plurality of token logic units is configured to perform the respective one of the plurality of comparisons by comparing the one of the plurality of character classes to the operand of the respective one of the plurality of comparisons; and an execution unit configured to select an action from the plurality of actions in response to the output of one of the plurality of token logic units and wherein the execution unit is further configured to execute the selected action and wherein the execution unit is configured to store tokenizing state information to the memory based on the selected action.

7. The system of claim 6, wherein the plurality of token logic units comprises at least three token logic units.

8. The system of claim 6, wherein the classifier is configured to identify the at least one character based on XML.

9. The system of claim 6, wherein at least one of the plurality of token logic units is configured to compare the at least one character to the operand of one of the plurality of comparisons.

10. The system of claim 6, wherein at least one of the plurality of token logic units is configured to compare tokenizing state information to the operand of the at least one of the plurality of comparisons.

11. The system of claim 6, wherein said memory comprises a first memory configured to store the token and a second memory configured to store the instructions.

12. An integrated circuit comprising a computer readable medium having stored thereon a software defining a process that when being executed causes a logic associated therewith to perform the acts of:
receiving at least one character from a document;
assigning the at least one character to at least one of a plurality of character classes;
loading an instruction wherein the instruction comprises a plurality of comparisons and a plurality of actions and wherein each of the plurality of comparisons comprises at least one operand;
concurrently performing at least some of the plurality of comparisons wherein performing said at least one of the plurality of comparisons comprises comparing the at least one of the plurality of character classes with the at least one operand of the instruction;
selecting at least one of the plurality of actions to perform based on at least one result of the comparing; and
executing the at least one of the plurality of actions; and
storing tokenizing state information to a memory in response to executing the action.

13. The integrated circuit of claim 12, wherein performing at least one of the plurality of comparisons comprises comparing the at least one character to the at least one operand.

14. The integrated circuit of claim 12, wherein performing at least one of the plurality of comparisons comprises comparing tokenizing state information to the at least one operand.

15. The integrated circuit of claim 12, wherein storing the tokenizing state information comprises outputting a token to the memory.

16. The integrated circuit of claim 12 comprising an FPGA (Field Programming Gate Arrays).

17. A computer implemented system for tokenizing a document, the system comprising:
means for receiving at least a portion of a document, the portion comprising at least one character;
means for assigning the at least one character to at least one of a plurality of character classes;
means for identifying at least one instruction;
means for concurrently comparing at least two of the plurality of character classes to an operand defined by the instruction;
means for selecting at least one action from a plurality of actions defined by the instruction to perform in response to the means for comparing; and
means for executing the at least one action,
- wherein the executing means is configured to store tokenizing state information to a memory based on executing the at least one action.

18. The system of claim 17, wherein the comparing comprises comparing the at least one character to an operand.

19. The system of claim 17, wherein the comparing comprises comparing saved tokenizing state information to an operand.

20. The system of claim 17, wherein storing tokenizing state information comprises storing a token.

21. The system of claim 17, wherein at least one of the means for assigning, comparing, selecting, and executing comprises an FPGA (Field Programming Gate Arrays).

* * * * *